United States Patent
Schlosser et al.

(10) Patent No.: US 10,482,664 B1
(45) Date of Patent: Nov. 19, 2019

(54) AUGMENTED AND VIRTUAL REALITY SYSTEM AND METHOD FOR CONDUCTING TRANSACTIONS

(71) Applicant: JPMorgan Chase Bank, N.A., New York, NY (US)

(72) Inventors: Ryan A. Schlosser, New York, NY (US); Alex Lieberman, Marlboro, NJ (US); Christian Desousa, Martinsville, NJ (US); Spencer Gray, Chicago, IL (US); James D. Porterfield, Pipe Creek, TX (US); Nicholas Hoeffler, Chicago, IL (US); Jimmy Z. Ye, New York, NY (US); Mariah Cleveland, Hoboken, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 80 days.

(21) Appl. No.: 15/381,173

(22) Filed: Dec. 16, 2016

(51) Int. Cl.
| | |
|---|---|
| *G06T 19/00* | (2011.01) |
| *G06Q 30/06* | (2012.01) |
| *G06Q 20/32* | (2012.01) |
| *G06Q 20/40* | (2012.01) |

(52) U.S. Cl.
CPC ....... *G06T 19/006* (2013.01); *G06Q 20/3223* (2013.01); *G06Q 20/3278* (2013.01); *G06Q 20/4014* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 8,494,961 | B1* | 7/2013 | Lucas | G06Q 20/1085 705/35 |
| 2013/0278631 | A1* | 10/2013 | Border | G02B 27/017 345/633 |
| 2014/0285522 | A1* | 9/2014 | Kim | G06T 19/006 345/633 |
| 2014/0336876 | A1* | 11/2014 | Gieseke | G06F 3/005 701/36 |

(Continued)

OTHER PUBLICATIONS

Martin, "Walmart Rolls Out 3D Virtual Shopping Experience", Jun. 28, 2018, 4 pages, FOX News Network, LLC, Retrieved from the Internet: <https://www.foxbusiness.com/markets/walmart-rolls-out-3d-virtual-shopping-experience>.

*Primary Examiner* — Peter Hoang

(74) *Attorney, Agent, or Firm* — Greenblum & Bernstein, P.L.C.

(57) ABSTRACT

An AR/VR system is provided for facilitating transactions. A computer memory stores at least one browser for accessing and downloading at least one downloadable mobile application, wherein the mobile application is downloadable over the Internet. A computer processor executes the instructions stored in memory and accesses the stored mobile application to operate in conjunction with an AR/VR device to perform multiple steps. The steps include capturing an image of an identifying object and authenticating an authorized system user based on the captured image. The steps additionally include receiving selection of an action from the authorized user, providing a virtual environment or overlays for a real environment based on the selected action, and executing user instructions within the virtual environment or real environment with overlays in accordance with the selected action.

20 Claims, 8 Drawing Sheets

(56) References Cited

U.S. PATENT DOCUMENTS

| | | | |
|---|---|---|---|
| 2015/0324645 A1* | 11/2015 | Jang | G06F 3/012 345/633 |
| 2016/0063484 A1* | 3/2016 | Carpenter | G06Q 20/354 705/41 |
| 2016/0109954 A1* | 4/2016 | Harris | G06F 3/017 345/156 |

* cited by examiner

AUGMENTED AND VIRTUAL REALITY SYSTEM AND METHOD FOR CONDUCTING TRANSACTIONS

FIELD OF THE INVENTION

Embodiments of the present invention are generally related to systems and methods for utilizing augmented and virtual reality to enhance transactions. The transactions include, for example, financial transactions such as in-person and online shopping transactions.

BACKGROUND OF THE INVENTION

With the popularization of smartphones, tablets and other mobile devices, mobile applications, or "apps," have become household terms. Apps are computer applications that execute on mobile devices. Like applications that execute on traditional computing devices, apps allow users to perform a wide range of actions, from simple (e.g., access the Internet, take a photo) to specialized (e.g., file tax forms, play a board game). For instance, many banking institutions provide customers with apps to access to bank accounts to review balance information, transfer money, pay bills, and perform other related actions. Similarly, many financial institutions also provide customers with apps that review the performance of the stock markets, complete trades, configure automated trades using user-defined limits and stops, and perform other intricate trading operations. Various vendors provide mobile apps for use by their customers for making purchases, obtaining loyalty points and rewards, receiving information about promotions, etc. Purchasers desiring to make a purchase typically use mobile apps or search web sites over the Internet to find an item for purchase.

In recent years devices have been popularized for creating a virtual reality or augmenting an existing reality. While virtual reality offers a digital recreation of a real life setting, augmented reality delivers virtual elements as an overlay to the real world. These augmented reality (AR) and virtual reality (VR) devices utilize the same types of technologies and often operate in conjunction with apps in order to enhance the field of use or experience targeted by the app. Virtual reality is often delivered through the use of a head mounted or handheld controller that users operate to control and navigate their actions in an environment created to simulate the real world. Such AR and VR devices include, for example, Facebook Oculus™, Microsoft HoloLens™, Google Glass™, and AR Helmet™. VR and AR are being used more frequently in mobile devices such as laptops, smart phones, and tablets to alter interaction through the use of digital images. VR and AR can also be blended to generate a fully immersive experience.

Apps that operate in conjunction with VR and AR devices include, for example, CrowdOptic, that applies algorithms and triangulation techniques to photo metadata including GPS positions, compass heading, and a time stamp to arrive at a relative significance value for the photo objects. CrowdOptic technology can be used by Google Glass users to learn where to look at a given point in time.

AR and VR have been used in many applications including, but not limited to construction, education, sports, entertainment, search and rescue, beauty, and military. However, AR and VR devices and applications have been under-utilized with respect to facilitating completion of everyday tasks. For example, no sophisticated AR or VR applications exist for facilitating completion of transactions, such as online shopping and in-person shopping transactions requiring payments or exchange of funds.

Accordingly, a solution is needed that will allow individuals to utilize AR/VR technology to enhance their everyday shopping and purchasing experiences. The solution should operate automatically and dynamically adapt to differing situations.

SUMMARY OF THE INVENTION

Embodiments of the invention are directed to an AR/VR system for facilitating transactions. The system includes a computer memory storing at least one browser for accessing and downloading at least one downloadable mobile application, wherein the mobile application is downloadable over the Internet and least one computer processor executing the instructions stored in memory and accessing the stored mobile application to operate in conjunction with an AR/VR device to perform multiple steps. The steps include capturing an image of an identifying object, authenticating an authorized system user based on the captured image, and receiving selection of an action from the authorized user. The steps further include providing a virtual environment or overlays for a real environment based on the selected action and executing user instructions within the virtual environment or real environment with overlays in accordance with the selected action.

Embodiments of the invention additionally include an AR/VR method for facilitating transactions. The method includes implementing at least one browser for accessing and downloading at least one downloadable mobile application, wherein the mobile application is downloadable over the Internet and stored in a computer memory. The method further includes utilizing at least one computer processor executing the instructions stored in memory and accessing the stored mobile application to operate in conjunction with an AR/VR device to perform multiple steps. The steps include capturing an image of an identifying object, authenticating an authorized system user based on the captured image, receiving selection of an action from the authorized user, providing a virtual environment or overlays for a real environment based on the selected action, and executing user instructions within the virtual environment or real environment with overlays in accordance with the selected action.

In aspects of the invention, system users are able to shop both online and in person, conduct banking transactions, and perform other actions within a VR/AR environment using a single multifunctional app or using multiple inter-related mobile applications.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide a method and system for utilizing augmented and virtual reality to enhance transactions. In particular, embodiments of the invention provide for authentication of users using augmented and virtual reality and based on the authentication, allowing users to engage in various activities, such as online and in-person shopping enhanced by VR/AR technologies.

Figure 1:
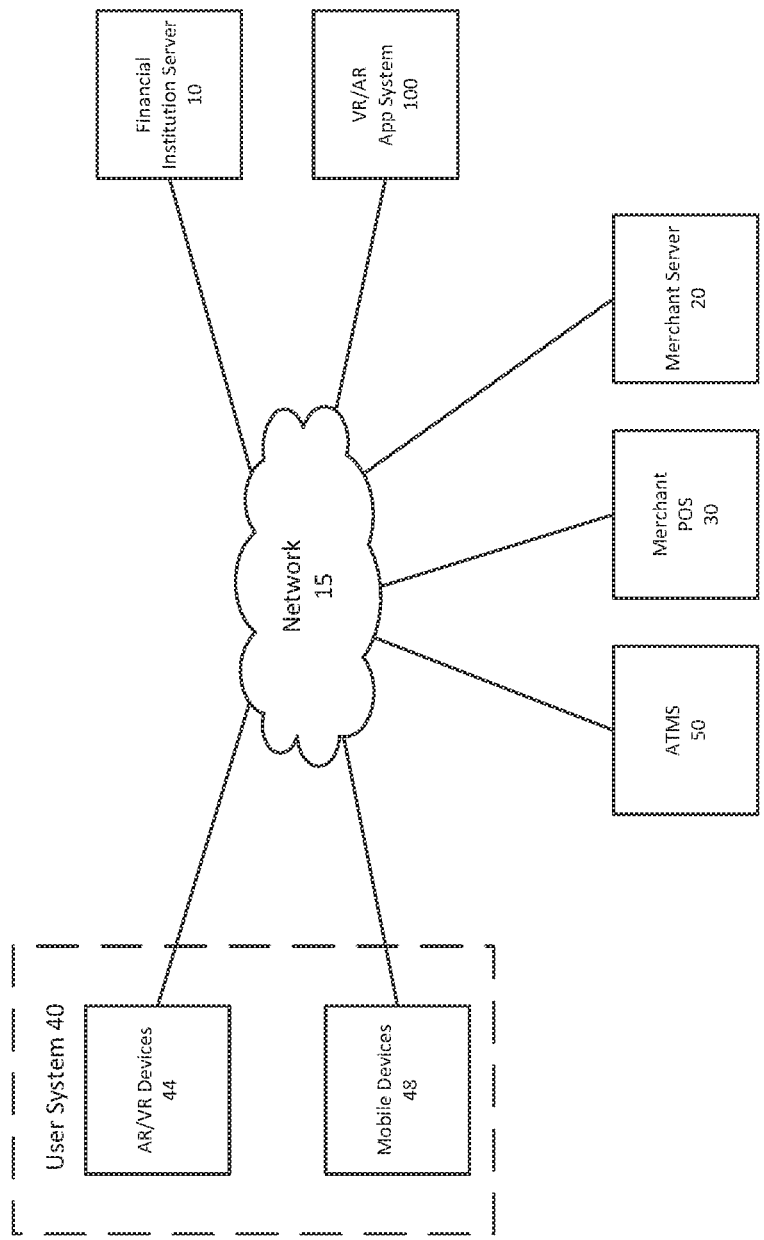
FIG. 1 is a block diagram illustrating an operating environment for a virtual and augmented reality system in accordance with an embodiment of the invention.

FIG. 1 is a block diagram illustrating an operating environment for operation of methods and systems of the invention. User systems 40 are connected over a network 15 with cooperating systems including a financial institution server 10, a virtual and augmented reality (VR/AR) server 100, ATMs 50, merchant POS systems 30, and merchant servers 20. Additional systems or devices may be included in the operating environment.

The virtual and augmented reality (VR/AR) application system 100 may operate through a host server that administers multiple computing systems and applications for internal and external users. The VR/AR system 100 can host web sites, files, images, games and similar content. The VR/AR system can be shared among many clients.

The network 15 is preferably the Internet, but may be or include other types of networks. Furthermore, even though only one network is shown, multiple networks may be used. The network 15 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The financial institution server 10 may be or include a computing system that provides access to user financial accounts. The financial institution server 10 may be hosted by, for example, a financial institution and may access checking accounts, savings accounts, bank card accounts, investment accounts, and other types of accounts. The financial institution server 10 may further provide access to bank branch functionality including loan and card services.

The merchant server 20 may include at least one processor and multiple applications executed by the processor capable of performing desired functions to interact with applications of the VR/AR system 100. The applications of the VR/AR system 100 interact with the merchant server 20 to ascertain merchant inventory and to provide tracking of transactions, as will be further explained below.

The merchant systems 20 may include a browser for accessing information provided by the VR/AR apps of the VR/AR system 100 and other connected systems that offer such functionality over the Internet or any other network. The merchant systems 20 may additionally be or include mobile systems, such as smart phones, tablets, or other portable computing apparatus. The merchant systems 20 may include mainframe computers, personal computers, desktop or laptop computing systems and the like.

The user systems 40 may include AR/VR devices 44 and mobile devices 48. Other devices may also be included in the user systems 40. The AR/VR devices 44 may include any of those identified above, such as headsets or mobile devices with VR/AR capabilities. The mobile devices 48 may include handheld devices including mobile smartphones, such as Android® phones and iPhones®, tablets, or handheld wireless devices such as PDAs, multiprocessor systems, microprocessor-based or programmable consumer electronics, minicomputers, other handheld devices that may now be available or may in the future become available. These user devices 40 may utilize a downloadable app supplied by the AR/VR system 100 for use in conjunction with the connected systems.

The mobile devices may include a processor and a memory. The memory may include, for example, applications and a browser for accessing web pages over the Internet. The processor may also be connected to additional components, either stored in a memory or installed as separate hardware components, such as for example battery or power source, clock, camera, input interface, network interface, output devices, geo-locator, and operating system.

While the mobile device is described herein as interacting over the Internet with the AV/VR system 100 through the use of mobile applications, the mobile device may additionally or alternatively interact with the AR/VR system 100 using a browser to access an AR/VR website as will be further described below. In embodiments of the invention, push notifications from the VR/AR system may cause the user mobile device to access one or more URLs from a VR/AR website.

Figure 2:
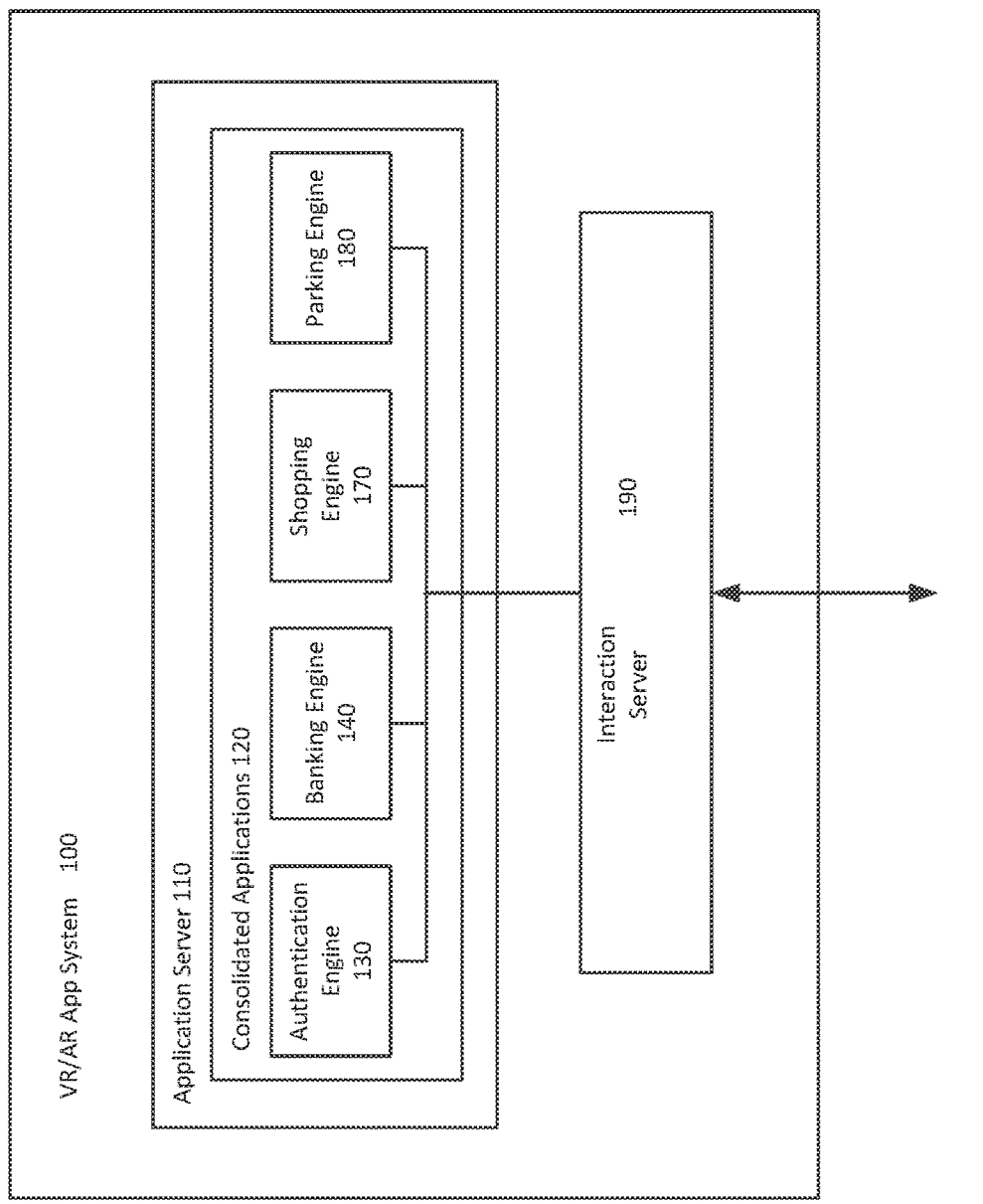
FIG. 2 is a block diagram illustrating a virtual and augmented reality system in accordance with an embodiment of the invention.

FIG. 2 is a block diagram illustrating a virtual and augmented reality system 100 in accordance with an embodiment of the invention. The VR/AR system 100 may include a memory for storing multiple consolidated applications 120. The consolidated applications 120 may include an authentication engine 130, a banking engine 140, a shopping engine 170, and a parking engine 180. Other applications or engines may also be included. An interaction server 190 delivers functionality from these engines to external devices The authentication engine 130 may server to interact with user systems including user mobile devices to authenticate users. Authentication may occur in a specific manner as will be further described below and may additionally occur through standard methods including usernames, passwords, security questions, and biometric factors. The authentication engine 130 may include a downloadable mobile app for authentication and may allow the system user to enter into a dialogue through the application. In embodiments of the invention, the authentication engine 130 operates in conjunction with the AR/VR device, for example, Microsoft HoloLens™ or a smartphone with a camera, to capture an image of a credit card, banking statement, or other financial object to initiate login to a financial account. In embodiments of the invention, the digital scan may simply comprise one of multiple authentication layers. The authentication engine 130 may utilize geolocation data, device fingerprinting, biometrics, PINs, IOT technology or other methods for multi-factor authentication. Once authenticated, users may view account information and initiate transactions. Users may perform transactions overlaid on the real world or simply access a basic interface.

In embodiments of the invention, the authentication engine 130 may operate in conjunction with virtual ATMs for authentication, using NFC (near field communications) or other proximity-indicating methods. An ATM screen may be displayed virtually to the AR/VR device as a user proceeds through a dialogue. For the benefit of other users, when the ATM is in use, the authentication engine 130 may cause it to display a message, such as "ATM is in use virtually and will be available momentarily". A one-time token associated with an ATM transaction may be utilized for authentication and may combine voice, PIN, or biometrics into the authentication process. In embodiments of the invention, ATMs may be modified to incorporate the above described functionality. Through this functionality, digital money movement can be accomplished from account to account using the virtual ATM.

The banking engine 140 may operate to facilitate banking functions such as money transfers, account opening, payments, withdrawals, and check orders. The banking engine 140 is preferably capable of operating in conjunction with VR technologies to simulate a bank branch lobby and provide available services. The bank branch lobby may for example, display available services through a teller. For enhancing the banking experience, the banking engine 140 may incorporate a teller voice throughout the user interaction, which in VR applications, may be utilized in conjunction with a simulated teller. When the banking engine 140 provides user services requiring a signature, the banking engine 140 may present a virtual document and record a user hand movement to be utilized as a signature. As an additional alternative, the banking engine 140 may present the virtual document and record user hand movements with a writing device or stylus for an added level of control. Alternatively, the banking engine 140 may present the virtual document and prompt the user to sign a physical piece of paper or digital screen. The AR/VR device would then use the recorded signature to populate the signature line-item on the document.

Additionally, the banking engine 140 may utilize Bluetooth low energy beacons to trigger transactions through the banking engine 140 itself or other associated engines. The banking engine 140 may listen for the signal from a Bluetooth low energy beacon that broadcasts information needed to trigger application functionality in the form of a customized transaction dialogue. The dialogue occurs securely through the banking engine 140 or other associated application. In embodiments of the invention, the banking engine 140 leverages this technology to facilitate transactions between two individuals. Each individual may set his or her mobile device to look for nearby users. The application will produce a selectable list of nearby user in response to the request. The party initiating the transaction will select from the list and engage in the dialogue.

The shopping engine 170 may facilitate both virtual and online shopping and may include separate applications or one integrated application. The shopping engine 170 may operate in conjunction with Bluetooth low energy beacons for in-person transactions. For example, merchants may utilize Bluetooth low energy beacons to trigger transactions via the shopping engine 170. The shopping engine 170 listens for the signal from the beacon and when the signals are detected from a user location, the shopping engine 170 takes the system user through a customized transaction dialogue. In embodiments of the invention, the dialogue is customized by the vendor or a financial institution.

Accordingly, when a system user possessing an AR/VR device is in the proximity of a vendor location, the detection process and activation of the shopping engine 170 may occur so that the system user sees promotional deals overlaying the vendor location. The promotional deals may include, for example, sales and coupons. If a system user utilizing an AR/VR device is traveling using a mapping system or if the user is utilizing an AR/VR device with geolocation functionality, the shopping engine 170 may display overlays of stores in the vicinity with promotional deals available. The particular deals displayed may be based on transactional history of past purchases for the user, historically documented visits to merchant locations, and social media interests of selected merchants.

When a system user browses inside of a merchant location, the shopping engine 170 may show promotional and/or standard prices overlaying available items by default or upon receiving a user selection, for example by scan of a UPC code. The shopping engine 170 may also display available varieties of items to a user. For example, if an item on the shelf comes in five colors and three sizes, the user may see the colors and sizes overlaid onto the item through the AR/VR device. In order to select an item from a merchant location, the user may add an item to the shopping cart by scanning the item and may process payment at check-out by retrieving a digital wallet account and selecting a payment method.

While the user may utilize the digital wallet to make full payment, the user may also split a payment with another present party by prompting that person to authorize splitting the transaction. In embodiments of the invention, payment can be executed at the time of selection such that items cannot be added to the cart until payment is made. The shopping engine 170 may automatically deliver a receipt to the system user device.

As set forth above, the shopping engine 170 may also be utilized for online shopping in conjunction with an AR/VR device. A merchant's physical inventory may be displayed in an entirely virtual store, enabling a fully virtual shopping experience as the user browses aisles and available items. Merchants may submit store layouts for viewing that correspond to a physical store layout or may utilize pre-designed generic store layouts. The shopping engine 170 may provide virtual sales associates to guide users to desired items, help answer questions, handle returns, etc. In embodiments of the invention, users can utilize an AR device with the shopping engine in order view their home pantries or closets to see items they want to replenish, to see nutritional data, sizing information, colors, and to see the prices of the previously purchased items when possible. Furthermore, the shopping engine 170 may accept user body dimensions via manual entry, video, images or other methods to enable users to "try on" articles of clothing for fit when clothing dimensions are contained in a merchant's inventory database. The AR technology also allows for in-person overlays of color options as a user buys furniture and can overlay furniture or other items within the existing space of the user.

Further, the shopping engine 170 may prompt users with real time advertisements based on data provided from the AR/VR device. For example, a system user may be walking on a chilly morning with no gloves. The AR/VR device registers this condition and displays an advertisement for a pair of discounted gloves or a list of hand warmer options. Both online and in-person locations may be provided to the user. In this instance, the system user may not currently be engaged in a dialog with the shopping engine 170. Thus, the system may provide the selection generating a unique URL containing the selections on the transaction control website, by sending an alert to the subscriber mobile device including the URL, wherein selection of the URL will open the subscriber mobile app on the mobile device and allow the subscriber to view available selections on the transaction control web site. These alerts can be received by the subscriber mobile device when the subscriber is offline and bring the subscriber online through selection of the uniquely generated URL.

The parking engine 180 may also operate with AR/VR devices and geolocation. In embodiments of the invention, the parking engine 180 allows users to pay for parking by looking at a meter number, garage spot number, or by accepting a geo-location pop-up suggestion. Upon registering the parking location, the parking engine 180 may activate a user digital wallet with payment options. After the system user has parked, the parking engine 180 may operate in combination with geolocation and provide the customer with a push notification that he needs to return to the location to retrieve the vehicle or make another payment. The parking engine 180 may also provide push notification regarding nearby merchants with links to review and special deals and may further provide directions to the merchant location. In embodiments of the invention, the parking engine 180 may offer incentives, such as extended parking, for shopping at a particular merchant.

In further embodiments of the invention, upon initial parking, the parking engine 180 may provide a competitive parking bidding process allowing parking services to offer deals and compete against one another for user business. The parking engine 180 may also display available spaces in various facilities as well as free spaces in the vicinity. The parking engine 180 may send a push notification to the system user device attempting to park indicating a nearby available parking space, particularly when free parking is available. The parking engine 180 may integrate with the shopping engine 170 in order to allow a system user to order goods and have the goods ready upon system user arrival at the merchant location.

The interaction server 190 interacts with system user devices and external systems such as merchant systems to provide the functionality described above. The downloadable applications or engines preferably include downloadable mobile apps for use on system user devices. In embodiments of the invention, the system user utilizes a browser to visit a website provided by the interaction server to download the apps described above. Once downloaded, the downloadable mobile applications may operate on the user mobile devices to interact with interaction server 190. The downloadable applications may also include merchant applications for use with merchant systems. Various types of apps may be provided for merchant systems given the variety of merchant systems capable of interacting with the system.

The interaction server 190 controls and enables interaction between AR/VR system and external systems, such as user mobile devices, AR/VR devices, and merchant systems. The interaction server 190 provides a website accessible via a URL for interaction, but may also trigger alerts, send notifications, and provide a path for updating system users and other external systems. In embodiments of the invention, the interaction server 190 generates URLs and provides them to system users via push notifications when required.

Thus, the interaction server 190 operates to receive and perform initial processing for all requests received from mobile devices, other systems participants, and outside sources. In response to receiving a request, the interaction server 190 selects and forwards the request to the engine or external system responsible for satisfying the request. The interaction server 190 will also receive responsive information from the servers of the system and will form the transmission based on the received information. Thus, for instance, the interaction server 190 will automatically generate a transmission with a structure that would be understood by a given app with which the transmission is directed. The interaction server 190 will also form messages for other computer systems internal and external to the system.

Figure 3:
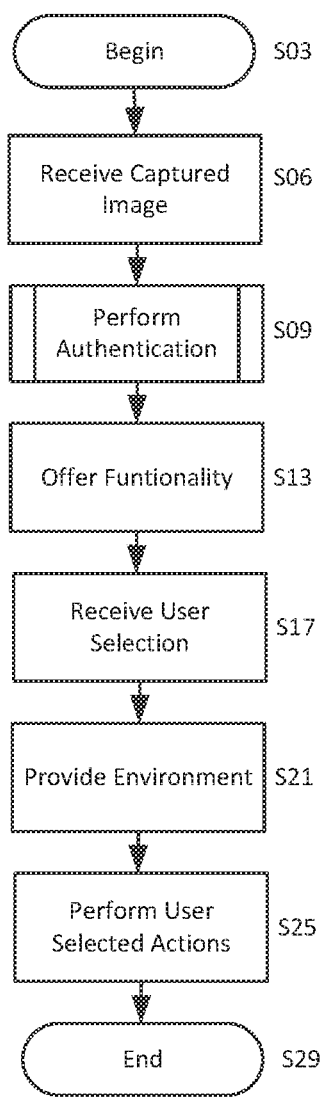
FIG. 3 is a flow chart illustrating a process for facilitating a transaction in accordance with an embodiment of the invention.

FIG. 3 is a flow chart illustrating a process for initiating actions with the VR/AR system in accordance with an embodiment of the invention. The process starts in S03 and the system receives a captured image in S06. In embodiments of the invention, the captured image is an identifying credential, such as a credit card, drivers, license, bank statement, social security card, etc. captured by a camera on a mobile device or VR/AR device. In process S09, the system authenticates the system user attempting to access the VR/AR system. The authentication process is described in greater detail with respect to FIG. 4 below. In S13, upon successful authentication, the system offers functionality to the system user. The functionality may be offered through the VR/AR device or mobile device and may including the banking, parking, and shopping functionality as described above. In step S17, the system receives an app or functionality selection from the user. In S21, the system provides the virtual or augmented reality environment in response to the requested functionality. In S25, the system is responsive to user requests to perform user requested actions. The process ends in S29.

Figure 4:
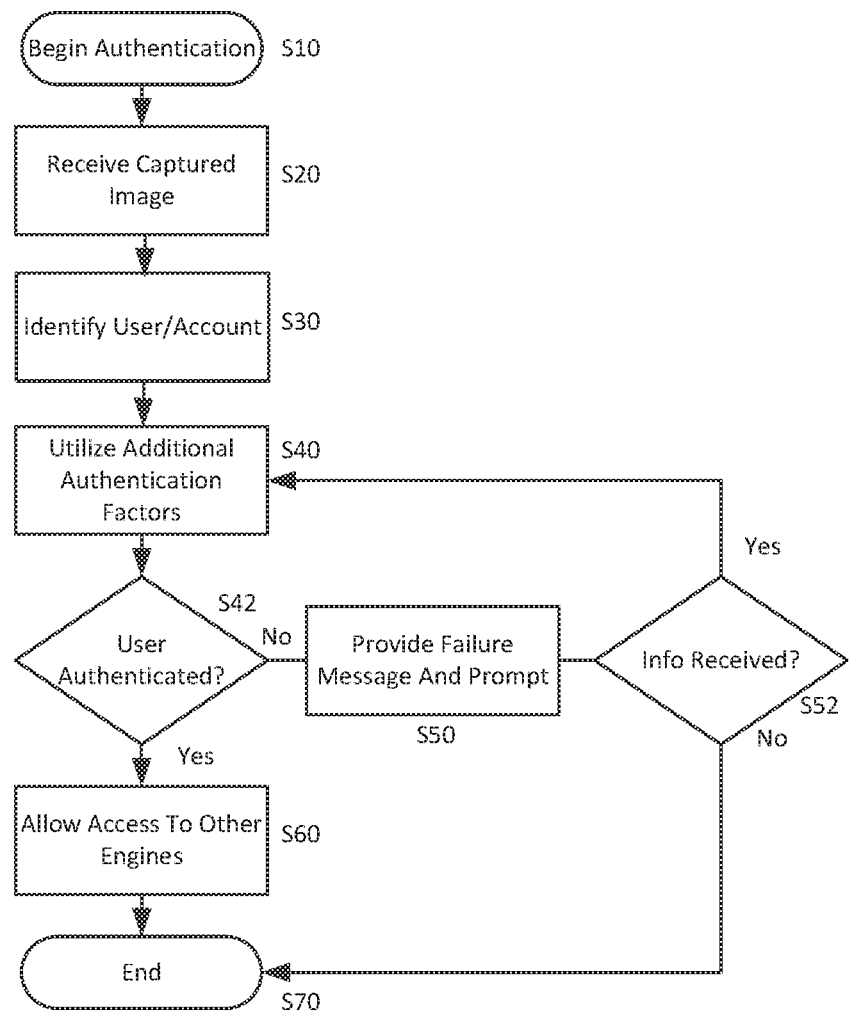
FIG. 4 is a flow chart illustrating a virtual and augmented reality authentication process in accordance with an embodiment of the present invention.

FIG. 4 is a flow chart illustrating a virtual and augmented reality authentication process in accordance with an embodiment of the present invention. In S10, the authentication beings and the system receives a captured image in S20. In S30, the system identifies a user or account. In S40, the system utilizes additional authentication factors such as security questions, biometric factors, or a PIN. In S42, the system determines if the user is authenticated.

If the user has been authenticated in S42, the system allows access to other engines in S60 and the process ends in S70. If the user has not been authenticated in S42, the system provides a failure message and prompts for further authentication information in S50. If further authentication information is received in S52, the system utilizes the additional factors by returning to S40. If no further authentication information is received, the authentication process ends unsuccessfully at S70.

Figure 5:
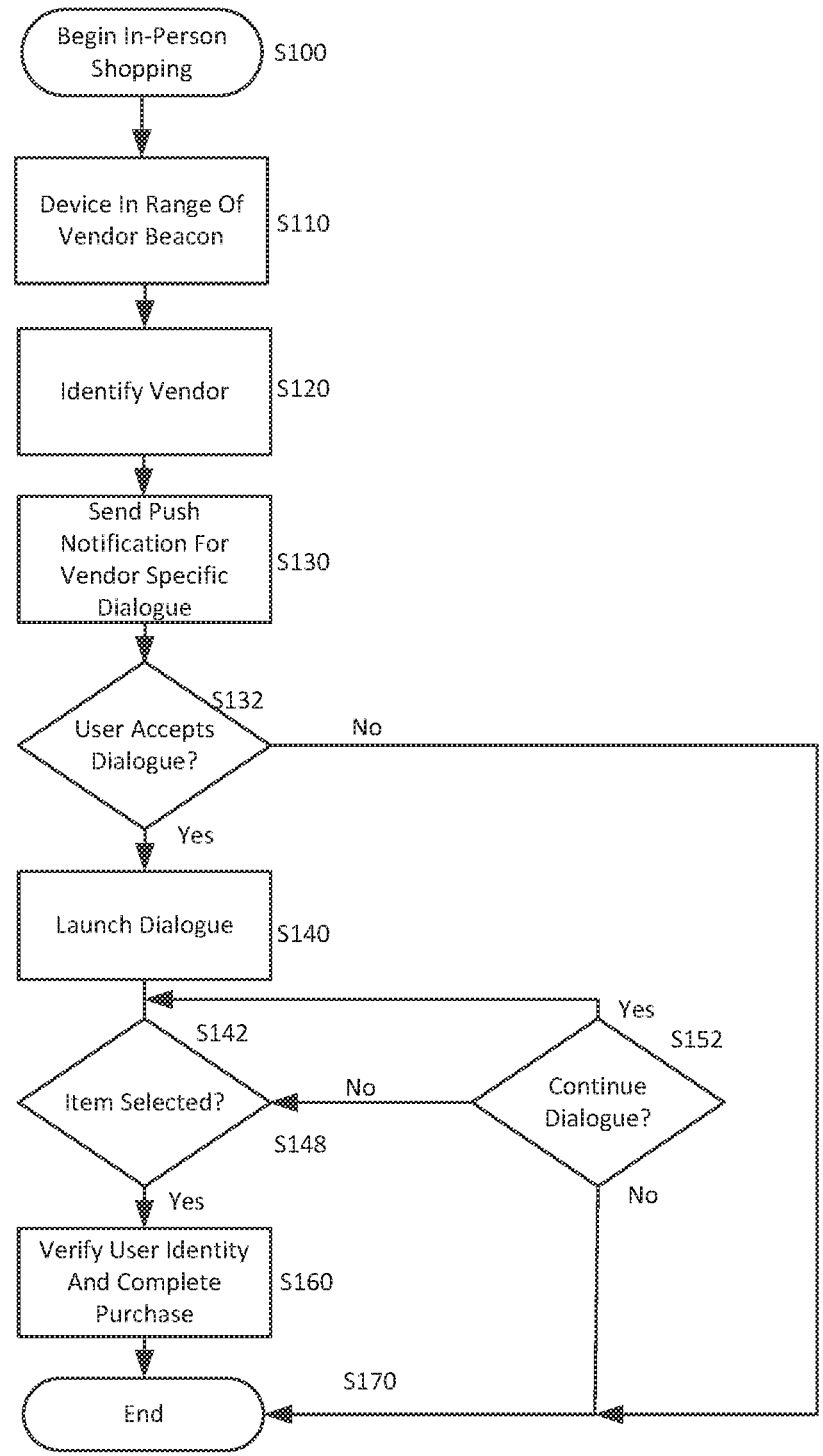
FIG. 5 is a flow chart illustrating a virtual and augmented reality in-person shopping process in accordance with an embodiment of the invention.

FIG. 5 is a flow chart illustrating a virtual and augmented reality in-person shopping process in accordance with an embodiment of the invention. The process begins in S100 and the system user device enters the range of a vendor beacon in S110. In S120, the system user device, through a mobile application, identifies the vendor based on a Bluetooth lower energy universally unique identifier (BLE UUID) broadcast by the vendor beacon. In S130, the system sends a push notification to the system user for a vendor specific dialogue. In S132, the system determines if the system user has accepted the dialogue. If the system user does not accept the dialogue in S132, the process ends in S170. However, if the system user accepts the dialogue in S132, the system launches the dialog in S140. In S142, the system determines if the user has selected an item in S148.

If the user has not selected an item in S148, the system determines whether the dialog should be continued in S152. If the dialogue is not continued, the process ends in S148. If the dialogue is continued in S152, the system continues to monitor for selection of an item in S148. When an item is selected in S148, the system verifies the user identity and completes the purchase in S160. The process is completed in S170 without the need for the system user to visit the check-out line or register.

Figure 6:
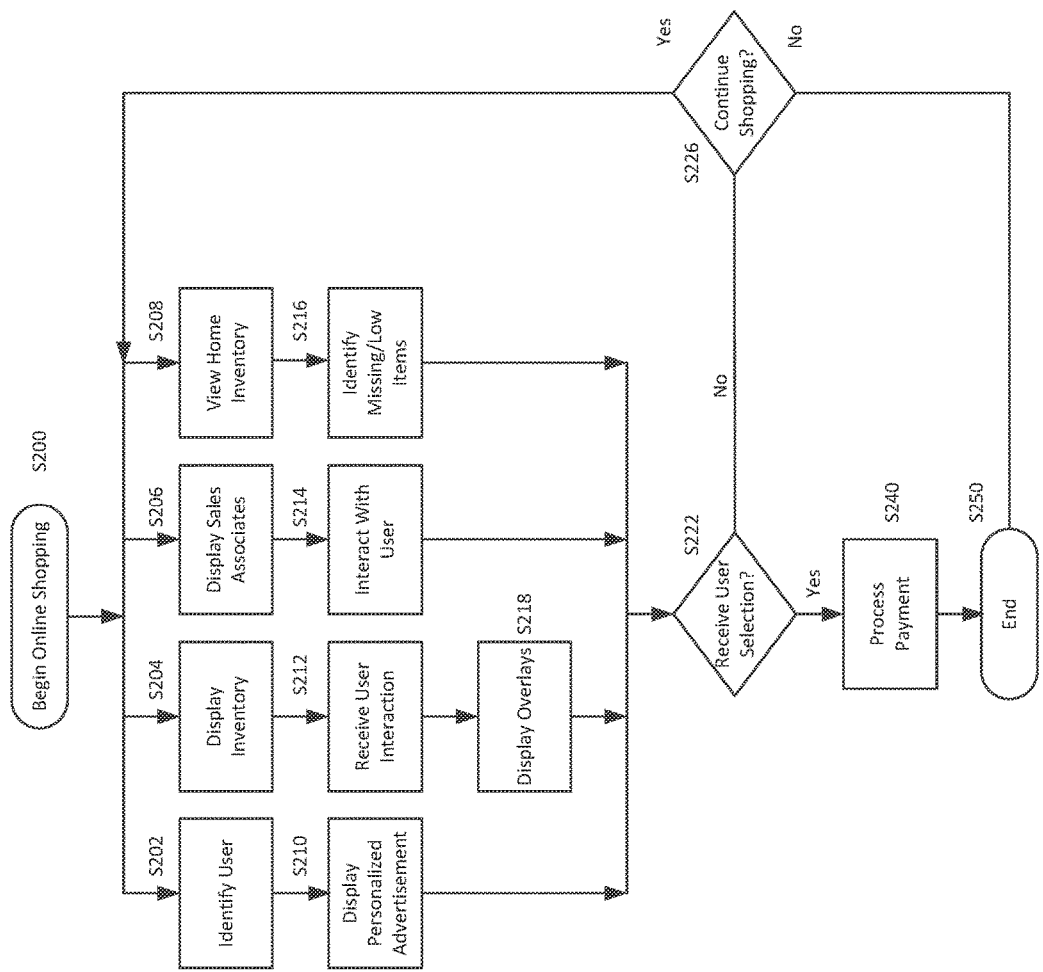
FIG. 6 is a flow chart illustrating a virtual and augmented reality online shopping process in accordance with an embodiment of the present invention.

FIG. 6 is a flow chart illustrating a virtual and augmented reality online shopping process in accordance with an embodiment of the present invention. The user begins online shopping in S200. In S202, the system identifies the user and may display personalized results based on the identification. Upon user identification in S210, the system may display a personalized advertisement to the user in S210.

The system also displays inventory in S204, sales associates in S206, and home inventory in S208. These displays may be made automatically or in response to a user selection. Upon displaying inventory in S204, the system may receive a user interaction in S212. In response to the user interaction in S212, the system may display overlays in S218.

Upon display of the sales associate in S206, the system may interact with the user in S214. For example, the sales associate and system user may engage in discussion regarding a particular item.

As set forth above, in S208, the system displays a user's home inventory. The home inventory may for example, include items in a bedroom closet of the user, or items in a user pantry. In S216, the system may identify or allow the user to identify low or missing items in the pantry or closet.

In S222, the system determines if a user selection has been received. If no user selection has been received in S222, it is determined whether the user wants to continue shopping in S226. If the user wants to continue shopping in S226, the system continues to wait for a selection. If the user does not wish to continue shopping in S226, the process ends in S250.

If a user selection has been received in S222, the system processes a user payment in S240. The process ends in S250.

Figure 7:
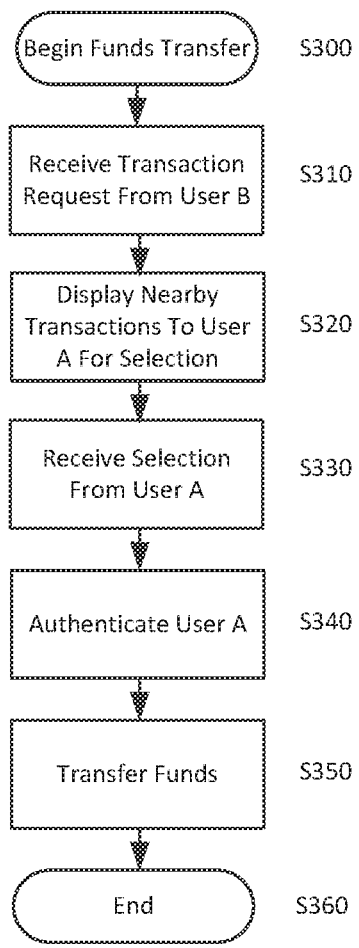
FIG. 7 is a flow chart illustrating a virtual and augmented reality funds transfer process in accordance with an embodiment of the present invention.

FIG. 7 is a flow chart illustrating a virtual and augmented reality funds transfer process between two system users in accordance with an embodiment of the present invention. The system users may include a shopper and a merchant or any two individuals participating in the VR/AR system. The process begins in S300 and the system receives a transaction request with the BLE UUID from User B in S310. The system displays nearby transactions to User A for selection in S330. In S340, the system authenticates user A either by the methods identified above and/or with an agreed passphrase, and in S350, the system transfers funds. The process ends in S350.

Figure 8:
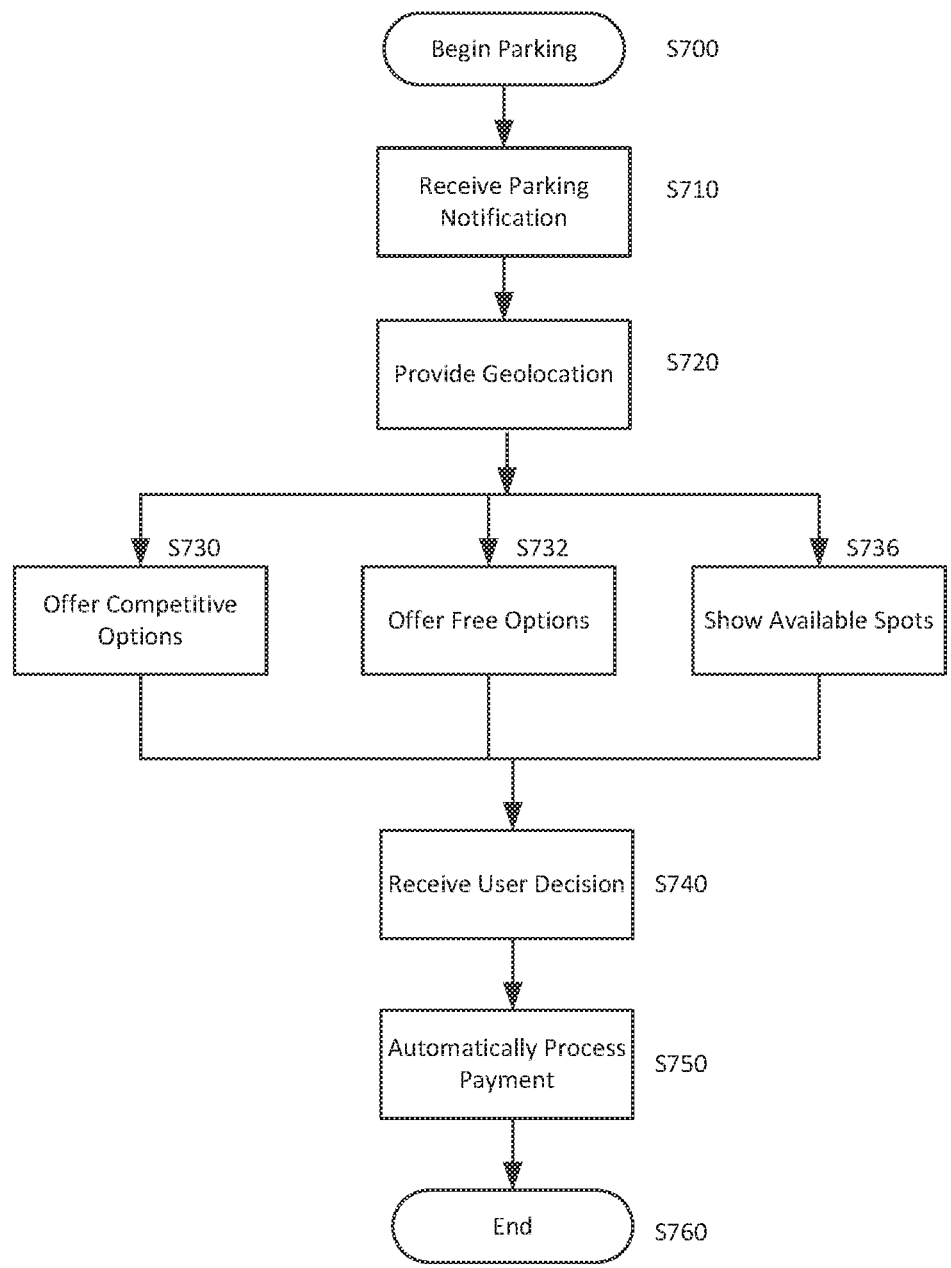
FIG. 8 is a flow chart illustrating a parking method in accordance with a further embodiment of the invention.

FIG. 8 is a flow chart illustrating a parking payment method in accordance with a further embodiment of the invention. The method begins in S700 and the system receives a parking notification in S710. The notification may be generated by the user through the user mobile device or may be based on geolocation or iBeacon technology. In S720, the system utilizes geolocation technology based on the notification. Given the user location, the system may offer competitive options in S730, offer free options in S732 or show available spots in S736. In S740, the system may receive a user decision and automatically process a user payment in S750 if the user decision requires a payment. The process ends in S760.

The system as illustrated in the block diagrams and flowcharts of FIGS. 1-8 includes one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with embodiments of the invention.

All of the components shown in the FIGs. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A system comprising:
   at least on computer processor executing instructions stored in a computer memory and accessing a mobile application to operate in conjunction with an augment reality or virtual reality (AR/VR) device to:
   register information relating to a physical location of a user of the AR/VR device;
   send a notification to the AR/VR device including at least one selectable uniform resource locator (URL) based on the registered information;
   receive, by the AR/VR device, the notification when the AR/VR device is offline;
   select the at least one selectable URL, wherein selection of the at least one selectable URL automatically brings the AR/VR device online to complete at least one AR/VR functionality;
   display the at least one selectable AR/VR functionality based on the registered information;
   capture an image of an identifying object;
   authenticate the user to access said at least one selectable AR/VR functionality and complete a transaction within the AR/VR functionality based on the captured image;
   receive a selection of the AR/VR functionality based on successful completion of the authentication;
   provide a virtual environment or overlays for a real environment based on the selected AR/VR functionality; and
   execute one or more received user requests within the virtual environment or the real environment with overlays in accordance with the selected AR/VR functionality.

2. The system of claim 1, wherein the identifying object comprises a bank statement, a credit card, or a driver's license.

3. The system of claim 1, wherein the selected AR/VR functionality is a shopping action.

4. The system of claim 3, wherein the shopping action is an in-person shopping action and a Bluetooth low energy beacon triggers a shopping engine.

5. The system of claim 4, wherein the shopping engine displays available varieties of an item overlaid on a physical item.

6. The system of claim 3, wherein the shopping action is an online shopping action and an AR or VR environment displays a home environment of the system user.

7. The system of claim 6, wherein the shopping engine displays a virtual inventory in a virtual store layout.

8. The system of claim 3, wherein geolocation of the system user triggers the shopping engine.

9. The system of claim 1, wherein the selected AR/VR functionality is a money transfer and a banking engine utilizes blue tooth low energy beacons to identify money transfer participants.

10. The system of claim 1, wherein the selected AR/VR functionality is a parking action, and the AR/VR device provides multiple parking options including an indication of available spaces.

11. An augment reality or virtual reality (AR/VR) method for facilitating transactions, the method comprising:
    utilizing at least on computer processor executing instructions stored in a computer memory and accessing a mobile application to operate in conjunction with an AR/VR device to:
    register information relating to a physical location of a user of the AR/VR device;
    send a notification to the AR/VR device including at least one selectable uniform resource locator (URL) based on the registered information;
    receive, by the AR/VR device, the notification when the AR/VR device is offline;
    select the at least one selectable URL, wherein selection of the at least one selectable URL automatically brings the AR/VR device online to complete at least one AR/VR functionality;
    display the at least one selectable AR/VR functionality based on the registered information;
    capture an image of an identifying object;
    authenticate the user to access AR/VR functionality and complete a transaction within the AR/VR functionality based on the captured image;
    receive a selection of the AR/VR functionality based on successful completion of the authentication;

provide a virtual environment or overlays for a real environment based on the selected AR/VR functionality; and execute one or more received user requests within the virtual environment or the real environment with overlays in accordance with the selected AR/VR functionality.

12. The method of claim 11, wherein the selected AR/VR functionality is a shopping action.

13. The method of claim 11, wherein the shopping action is an in-person shopping action and a Bluetooth low energy beacon triggers a shopping engine.

14. The method of claim 13, wherein the shopping engine displays available varieties of an item overlaid on a physical item.

15. The method of claim 11, wherein the shopping action is an online shopping action and an AR or VR environment displays a home environment of the system user.

16. The method of claim 15, wherein the shopping engine displays a virtual inventory in a virtual store layout.

17. The method of claim 11, wherein geolocation of the system user triggers the shopping engine.

18. The method of claim 11, wherein the selected AR/VR functionality is a money transfer and a banking engine utilizes blue tooth low energy beacons to identify money transfer participants.

19. The method of claim 11, wherein the selected AR/VR functionality is a parking action, and the AR/VR device provides multiple parking options including an indication of available spaces.

20. A non-transitory computer readable medium storing instructions thereon, wherein the instructions when executed by a computer processor causes the computer processor to perform steps including:

accessing a mobile application to operate in conjunction with an augment reality or virtual reality (AR/VR) device;

registering information relating to a physical location of a user of the AR/VR device;

sending a notification to the AR/VR device including at least one selectable uniform resource locator (URL) based on the registered information;

receiving, by the AR/VR device, the notification when the AR/VR device is offline;

selecting the at least one selectable URL, wherein selection of the at least one selectable URL automatically brings the AR/VR device online to complete at least one AR/VR functionality;

displaying the at least one selectable AR/VR functionality based on the registered information;

capturing an image of an identifying object;

authenticating the user to access said at least one selectable AR/VR functionality and complete a transaction within the AR/VR functionality based on the captured image;

receiving a selection of the AR/VR functionality based on successful completion of the authentication;

providing a virtual environment or overlays for a real environment based on the selected AR/VR functionality; and executing one or more received user requests within the virtual environment or the real environment with overlays in accordance with the selected AR/VR functionality.

\* \* \* \* \*